Patented Sept. 12, 1933

1,926,929

UNITED STATES PATENT OFFICE 1,926,929

MODIFICATION OF THE PREPARATION OF CAMOMILE EXTRACTS

Arthur Abelmann, Frankfort-on-the-Main, Germany, assignor to Chemisch-Pharmazeutische Aktiengesellschaft Bad Homburg, Bad Homburg, Germany, a corporation of Germany No Drawing. Application April 17, 1928, Serial No. 270,810, and in Germany July 2, 1927

4 Claims. (Cl. 167—63)

The invention relates to the preparation of camomile extracts by the extraction of camomile with suitable solvents, the extracts being adjusted to the desired efficiency.

When camomile is subjected to the usual extraction methods, extracts of varying composition and varying efficiency are obtained according to the quality of the plants employed, the choice of the extraction agent or agents, the working conditions and the like.

I have now undertaken the solution of the problem of adjusting such extracts, whose efficiency depends on the presence and proportions of various substances, to the desired efficiency or to increase their activity in one or another direction. In carrying out the researches in this direction it was found that a very important factor, viz the irritation preventing actions of such extracts, depends on the presence of camomile oil. Further experiments have shown that the extracts can be still further considerably improved by incorporating with them camomile oil in excess of that obtained by the extraction of camomile plants. In other words I have shown that by increasing the camomile oil content of the extract as compared with the remaining constituents a considerable irritation-reducing action is obtained. I have further found that, in place of or as well as camomile oil, other ethereal oils such as sage oil, oil of thyme, etc. may be incorporated with the camomile extract, whereby a considerable increase in the disinfecting action is obtained, whilst the primary actions of the camomile extract, depending on the combined action of various factors, remain unchanged.

The introduction of the camomile or other ethereal oils or oil mixtures can be effected with the aid of solvents, for example, by using alcoholic-aqueous solutions of the oil. Use can also be made of other solvents, for example by first dissolving the ethereal oils in other solutions, for example of soaps, and then adding the solution mixture to the plant extracts.

The process according to the invention can, for example, be carried out by extracting the camomile plants with alcoholic-aqueous solvents for example, 60% alcohol, relatively small quantities of ammonia, urea, alkalies, etc. being added. In this way it is possible to transfer all the valuable constituents of the camomile plant to the extract. The ethereal oils are then introduced in suitable proportions into the alcoholic-aqueous extracts obtained in this way or into the products of subsequent operations, such as can be obtained, for example, by evaporating in vacuo with the addition of glycerine and diluting the concentrate with water with the addition of small quantities of alcohol and of caustic soda solution.

The invention is illustrated by the following examples:

(1) 2 parts of a 20% alcoholic solution of camomile oil are stirred into 50 parts of an alcoholic-aqueous camomile extract prepared with the aid of small quantities of ammonia. The camomile oil goes into a clear solution in the extract. The solution so obtained remains clear even on standing, and can be diluted with water without precipitation taking place.

(2) 5 parts of a 20% solution of oil of thyme in alcohol are stirred into 5 parts of alcoholic-aqueous camomile extract. A clear liquid is obtained which can be diluted with water without precipitation taking place.

It has finally also been shown that the incorporation of difficultly soluble ethereal oils, especially camomile oil, can be promoted by simultaneously or previously introducing other ethereal oils, such as oil of thyme, into the extract. The solution obtained according to Example 2 can thus be employed with advantage as a starting material for the preparation of extracts reinforced with camomile oil. The camomile oil introduced into solutions of this sort dissolves more easily than when directly introduced into alcoholic-aqueous camomile extracts.

The process offers the advantage that the action of the camomile extracts can be strengthened, especially by increasing the irritation reducing action, and the extracts be adjusted to the desired uniform efficiency especially advantageous for certain purposes of application.

Further researches have shown that the properties of camomile extracts can be still further improved by subjecting them during or after their production to the action of rays, especially of ultra-violet rays. This treatment has a beneficial effect both on ordinary camomile extracts and also on those which are improved according to the present invention by the addition of camomile oil or other ethereal oils. The extracts may be subjected to the action of the rays according to the usual methods.

The extracts obtained by the new process are also especially suitable inter alia for the preparation of products such as salves, creams, pastes, soaps, powders, tablets and the like. The extracts can be mixed in suitable quantities for example with diluents or distributing agents such as salve bases, soap masses, powdered solid substances or the like.

For some purposes of application it has proved to be advantageous to employ the preparations in a solid easily doseable form. For this purpose, the liquid extract may, for example, be incorporated with an indifferent powder and the excess of solvent be evaporated. A further method of procedure, for example, is to saturate a portion of the indifferent powder with liquid camomile extract, to dry and to incorporate with the mixture a powder which has absorbed a certain amount of ethereal oils, for example, camomile oil. Mixed products of this sort may, for example, be employed as powders or be converted into pastes or the like. They are specially suitable for the preparation of tablets, in which case the formation into tablets can if necessary, be effected before the mixture of plant extract and powdered additions has completely dried.

I claim:—

1. A pharmaceutical preparation comprising an alkaline aqueous alcoholic extract of camomile and added camomile oil, the preparation showing no turbidity when diluted with water.

2. The process of preparing a pharmaceutical preparation rich in camomile oil and showing no turbidity when diluted with water which comprises extracting camomile with an alkaline aqueous alcoholic medium and adding camomile oil to the extract so obtained.

3. A pharmaceutical preparation comprising an alkaline aqueous alcoholic extract of camomile and an added ethereal oil, the preparation showing no turbidity when diluted with water.

4. The process of preparing a pharmaceutical preparation showing no turbidity when diluted with water which comprises extracting camomile with an alkaline aqueous alcoholic medium and adding an ethereal oil to the extract so obtained.

ARTHUR ABELMANN.